US012234672B2

(12) United States Patent
Lin et al.

(10) Patent No.: US 12,234,672 B2
(45) Date of Patent: Feb. 25, 2025

(54) BI-DIRECTIONAL ELECTRONIC LOCK DEVICE AND METHOD FOR SETTING UP THE SAME WHEN MOUNTED ON A DOOR

(71) Applicant: Tong Lung Metal Industry Co., Ltd., Chiayi County (TW)

(72) Inventors: Yu Lin, Chiayi (TW); Pai-Hsiang Chuang, New Taipei (TW); Ruei-Jie Jeng, Chiayi County (TW); Ding-Sian Cai, Chiayi County (TW)

(73) Assignee: Tong Lung Metal Industry Co., Ltd., Chiayi County (TW)

( * ) Notice: Subject to any disclaimer, the term of this patent is extended or adjusted under 35 U.S.C. 154(b) by 240 days.

(21) Appl. No.: 17/854,246

(22) Filed: Jun. 30, 2022

(65) Prior Publication Data

US 2023/0151642 A1 May 18, 2023

(30) Foreign Application Priority Data

Nov. 17, 2021 (TW) ................................ 110142687

(51) Int. Cl.
*E05B 63/04* (2006.01)
*E05B 47/00* (2006.01)
*E05B 63/00* (2006.01)

(52) U.S. Cl.
CPC .......... *E05B 63/04* (2013.01); *E05B 63/0017* (2013.01); *E05B 2047/0069* (2013.01)

(58) Field of Classification Search
CPC ..... E05B 2047/0017; E05B 2047/0069; E05B 63/04; E05B 63/042; E05B 47/0012; E05B 63/0017
See application file for complete search history.

(56) References Cited

U.S. PATENT DOCUMENTS

2011/0185554 A1* 8/2011 Huang .................... B23P 11/00 70/277
2011/0259059 A1* 10/2011 Wu .................... E05B 63/0017 70/91
2013/0219975 A1* 8/2013 Ainley .................. G08C 17/02 70/279.1
2019/0218824 A1* 7/2019 Ainley .................... G01D 5/04
2023/0116243 A1* 4/2023 Lu ...................... E05B 47/0012 70/277

FOREIGN PATENT DOCUMENTS

TW M570337 U * 11/2018 ............ E05B 47/00

* cited by examiner

*Primary Examiner* — Gilbert Y Lee
*Assistant Examiner* — Peter H Watson
(74) *Attorney, Agent, or Firm* — Akerman LLP; Peter A. Chiabotti; David J. Fernandez-Fidalgo

(57) ABSTRACT

A bi-directional electronic lock device includes a lock mechanism and a control unit. The control unit includes a position determining component driven by the lock mechanism to rotate, a sensor configured to generate a specific sensing signal for each of three positions with respect to the position determining component, a direction determining module that actuates the lock mechanism to move from a locked state toward an unlocked state, and that generates a directional signal based on the sensing signals, and a control module that is configured to, in response to receipt of the directional signal, set the lock mechanism, based on the directional signal, to operate in one of a left setting and a right setting.

8 Claims, 10 Drawing Sheets

BI-DIRECTIONAL ELECTRONIC LOCK DEVICE AND METHOD FOR SETTING UP THE SAME WHEN MOUNTED ON A DOOR

CROSS-REFERENCE TO RELATED APPLICATION

This application claims priority of Taiwanese Patent Application No. 110142687, filed on Nov. 17, 2021.

FIELD

The disclosure relates to a bi-directional electronic lock device, and a method for setting up the bi-directional electronic lock device when the same is mounted on a door.

BACKGROUND

Bi-directional electronic lock devices, which may be mounted on both left-handed doors and right-handed doors, were developed to facilitate the mounting of the electronic lock devices to the doors. During the operations of mounting a conventional bi-directional electronic lock device onto a door, one typically needs to manually set the conventional bi-directional electronic lock device to one of a left setting and a right setting based on a type of the door (left-handed or right-handed). In this manner, after the conventional bi-directional electronic lock device is mounted onto the door, the conventional bi-directional electronic lock device may be operated correctly (by a built-in controlling program) to switch between a locked state and an unlocked state based on the type of the door.

However, the step of manually setting up the conventional bi-directional electronic lock device may be prone to human errors, resulting in the conventional bi-directional electronic lock device being unable to operate correctly and/or causing damages to components of the conventional bi-directional electronic lock device.

SUMMARY

Therefore, an object of the disclosure is to provide a bi-directional electronic lock device that can be automatically set up to operate correctly when mounted on one of a left-handed door and a right-handed door.

According to one embodiment of the disclosure, the bi-directional electronic lock device is to be mounted on a door that is a left-handed door or a right-handed door. The bi-directional electronic lock device includes a lock mechanism and a control unit.

The lock mechanism includes a deadbolt, and is operable to switch between an unlocked state, in which the deadbolt is retracted into the door, and a locked state, in which the deadbolt is extended out of a side of the door, wherein the unlocked state is one of a left-side unlocked state and a right-side unlocked state.

The control unit that includes a position determining component, a sensor, a direction determining module, and a control module.

The position determining component is driven by the lock mechanism to rotate. The sensor is disposed to have a positional relationship with the position determining component in one of three different positions in terms of the sensor's contact, or the lack thereof, with the position determining component, and is configured to generate a specific sensing signal for each of the three positions.

The direction determining module is configured, when activated, to actuate the lock mechanism to switch to one of the left-side unlocked state and the right-side unlocked state while driving the position determining component, to receive a sequence of sensing signals from the sensor, and to generate a directional signal based on the sequence of sensing signals.

The control module is configured to, in response to receipt of the directional signal, set the lock mechanism, based on the directional signal, to one of a left setting, in which the lock mechanism is operable to switch between the left-side unlocked state and the locked state, and a right setting, in which the lock mechanism is operable to switch between the right-side unlocked state and the locked state.

Another object of the disclosure is to provide a method for setting up the above-mentioned bi-directional electronic lock device.

According to one embodiment of the disclosure, the method is for setting up a bi-directional electronic lock device that is mounted on a door, and includes:

executing a direction determining process, in which a lock mechanism of the bi-directional electronic lock device is actuated to drive a position determining component of a control unit of the bi-directional electronic lock device to rotate along a predetermined direction, the control unit including a sensor that is disposed to have a positional relationship with the position determining component in one of three different positions in terms of the sensor's contact, or the lack thereof, with the position determining component, and that is configured to generate a specific sensing signal for each of the three positions;

receiving a sequence of sensing signals from the sensor;

based on the sequence of sensing signals, generating a direction signal; and in response to receipt of the direction signal, setting the lock mechanism in one of a left setting and a right setting based on the direction signal.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
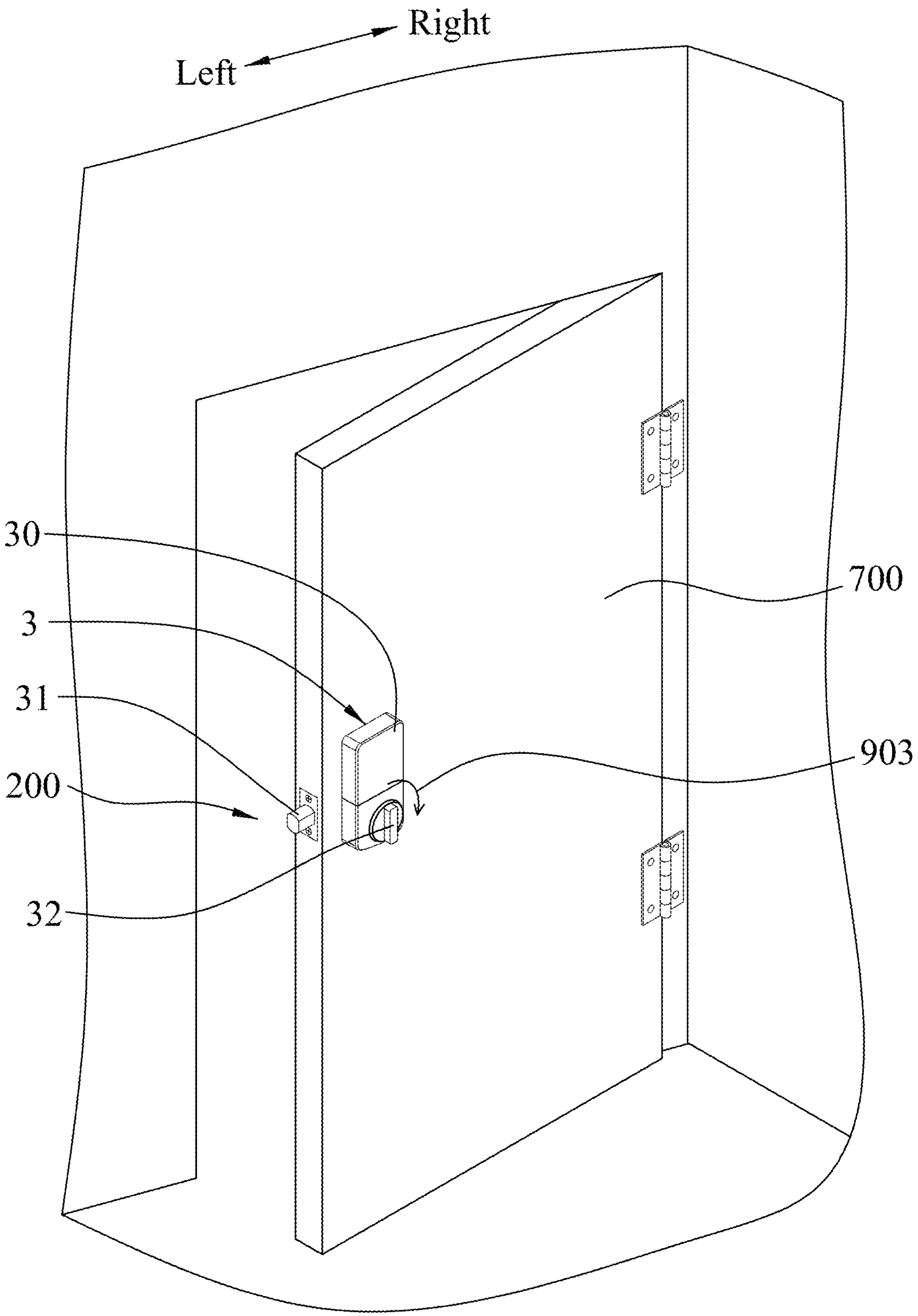
FIG. 1 is a perspective view illustrating a bi-directional electronic lock device mounted on a left-handed door according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a perspective view illustrating a bi-directional electronic lock device 200 mounted on a door 700 according to one embodiment of the disclosure. It is noted that the door 700 may be in the form of one of a left-handed door and a right-handed door. In the example of FIG. 1, from the perspective inside a room, of which the door 700 is an entrance, hinges of the door 700 are located at a right side, and the door 700 may be referred to as a left-handed door. On the other hand, in the case that the hinges of the door 700 are located at a left side, the door 700 may be referred to as a right-handed door.

Figure 2:
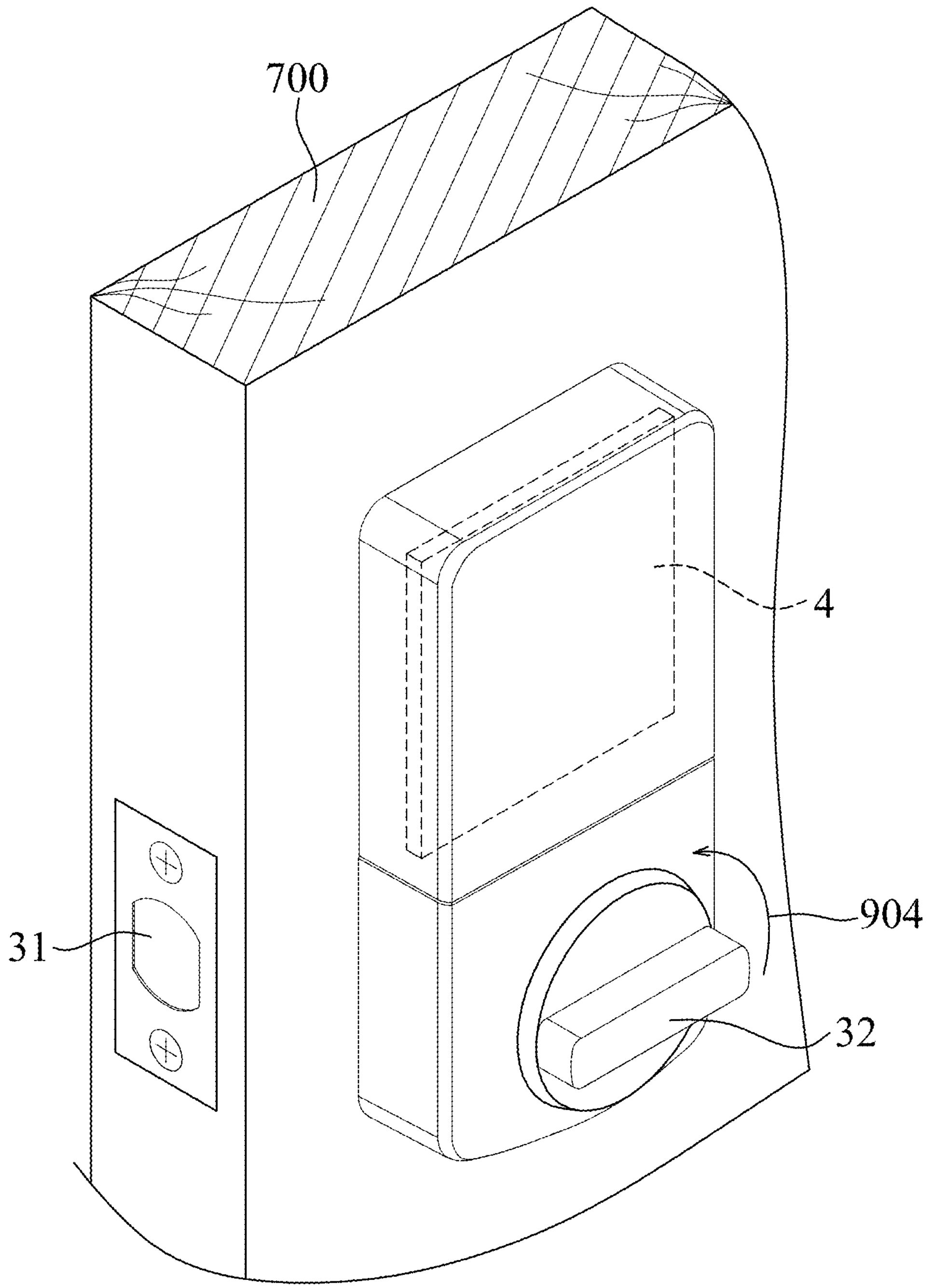
FIG. 2 is a perspective view of a lock mechanism of the bi-directional electronic lock device in a left-side unlocked state.
Figure 3:
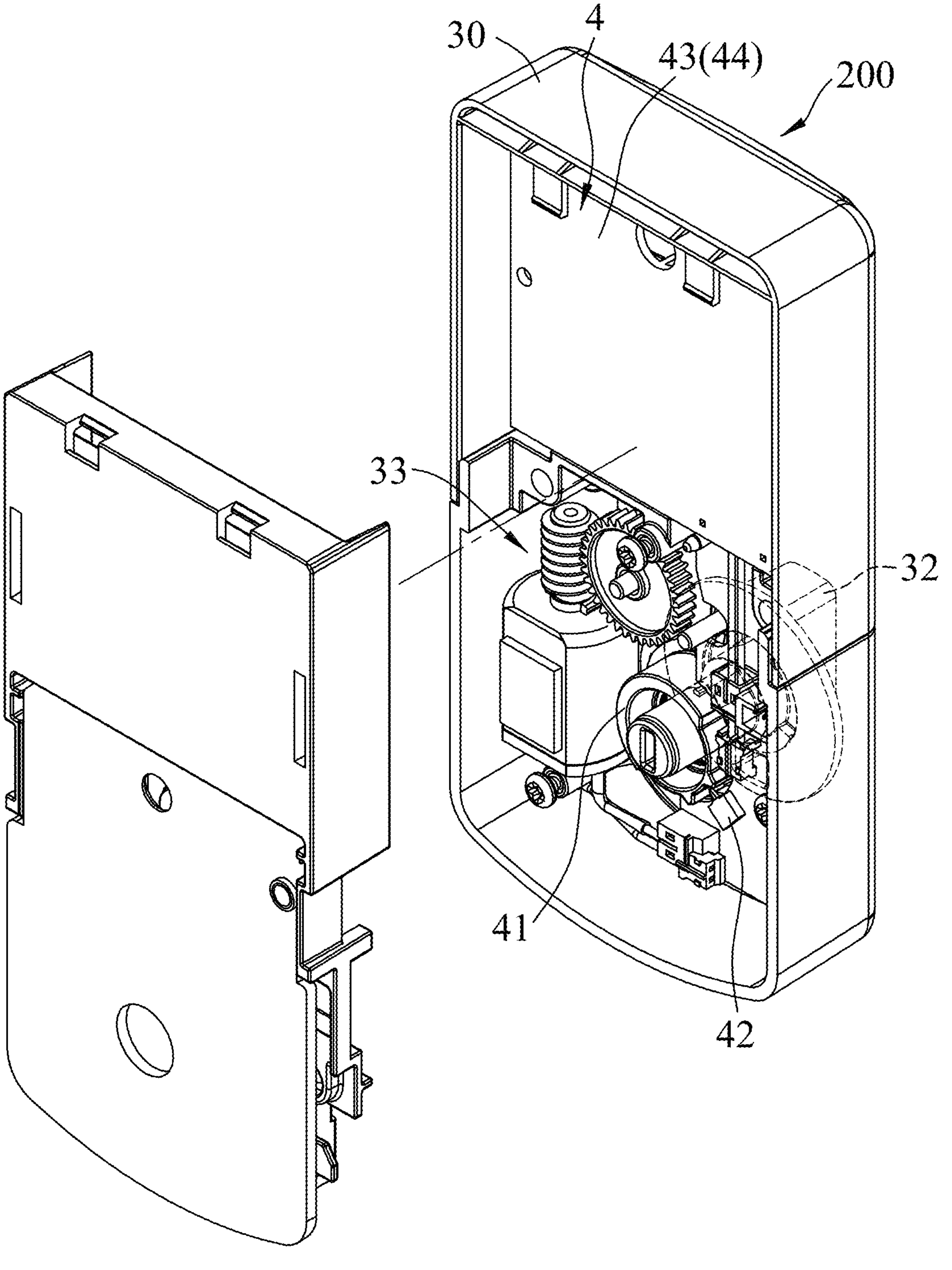
FIG. 3 is an exploded view of the bi-directional electronic lock device, illustrating a control unit in a housing according to one embodiment of the disclosure.
Figure 4:
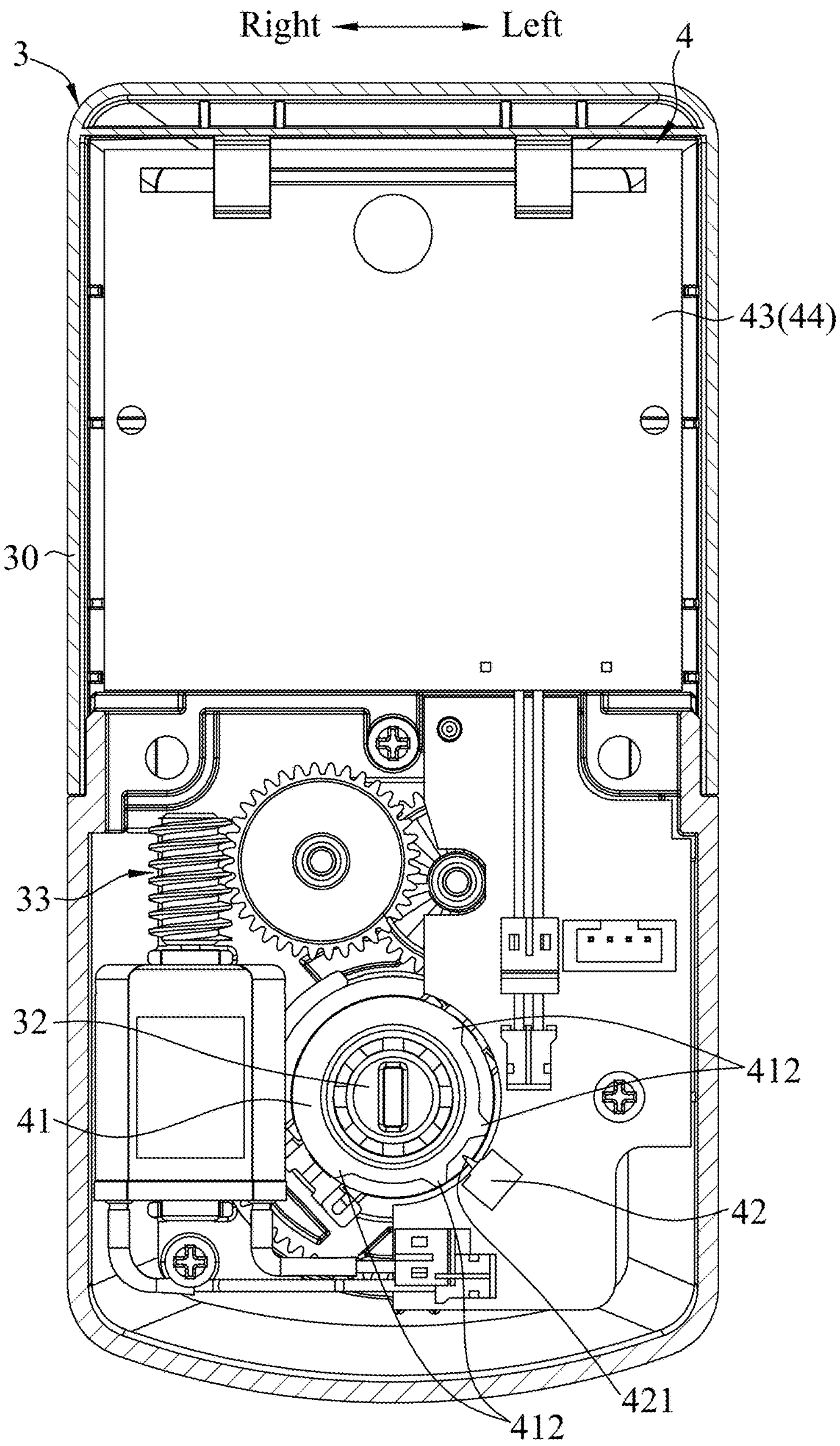
FIG. 4 is a side view illustrating components of the bi-directional electronic lock device in the housing.

Further referring to FIGS. 2 to 4, the bi-directional electronic lock device 200 includes a lock mechanism 3 and a control unit 4.

The lock mechanism 3 includes a housing 30, a deadbolt 31, a knob 32 and a transmission structure 33. The housing 30 is to be disposed on an inner surface of the door 700 that faces the inside of the room. The deadbolt 31 is operable to extend out of one side of the door 700 (i.e., a side opposite to the side where the hinges are located). The knob 32 is disposed on the housing 30. The transmission structure 33 is disposed inside the housing 30, and includes components such as gears, motors, etc., and is connected between the deadbolt 31 and the knob 32 for driving movement of the deadbolt 31 with respect to the door 700. It is noted that not all components of the lock mechanism 3 are depicted in the drawings as the operations of the components are readily known in the related art.

The lock mechanism 3 is operable to switch between an unlocked state, in which the deadbolt 31 is retracted into a side of the door 700, and a locked state, in which the deadbolt 31 is extended out of the side of the door 700.

In this embodiment, the lock mechanism 3 is operable to be set in one of a left setting and a right setting. When mounted on a left-handed door (see FIG. 1), the lock mechanism 3 is to be set in the left setting. In the left setting, the locked state of the lock mechanism 3 may be referred to as a left-side locked state, in which the deadbolt 31 extends out of the left side of the door 700, and the unlocked state of the lock mechanism 3 may be referred to as a left-side unlocked state, in which the deadbolt 31 is retracted inside the left side of the door 700 and can only be actuated to extend toward the left. In FIG. 2, the lock mechanism 3 is in the left-side unlocked state. When it is desired to lock the door 700, the knob 32 may be operated to turn counter-clockwise (along the arrow 904 in FIG. 2) by 90 degrees to switch to a position corresponding to the left-side locked state (see FIG. 1). When it is desired to unlock the door 700, the knob 32 may be operated to turn clockwise (along the arrow 903 in FIG. 1) by 90 degrees to switch to a position corresponding to the left-side unlocked state (see FIG. 2).

On the other hand, when mounted on a right-handed door, the lock mechanism 3 is to be set in the right setting. In the right setting, the locked state of the lock mechanism 3 may be referred to as a right-side locked state, in which the deadbolt 31 extends out of the door 700 through the right side, and the unlocked state of the lock mechanism 3 may be referred to as a right-side unlocked state, in which the deadbolt 31 is retracted inside the door 700 and can only be driven to extend toward the right.

It is noted that in this embodiment, the operations of the lock mechanism 3 between the locked state and the unlocked state may be controlled by the control unit 4, or manually operated by a user using the knob 32.

Specifically, the knob 32 may be manually rotated between a horizontal position and a vertical position. The deadbolt 31 and the knob 32 are connected such that when rotated, the knob 32 is actuated to move the deadbolt 31 between different positions (and therefore different states of the lock mechanism 3). In this embodiment, the horizontal position of the knob 32 corresponds to the unlocked state (see FIG. 2), and the vertical position of the knob 32 corresponds to the locked state (see FIG. 1).

The control unit 4 includes a position determining component 41, a sensor 42, a direction determining module 43 and a control module 44.

Figure 5:
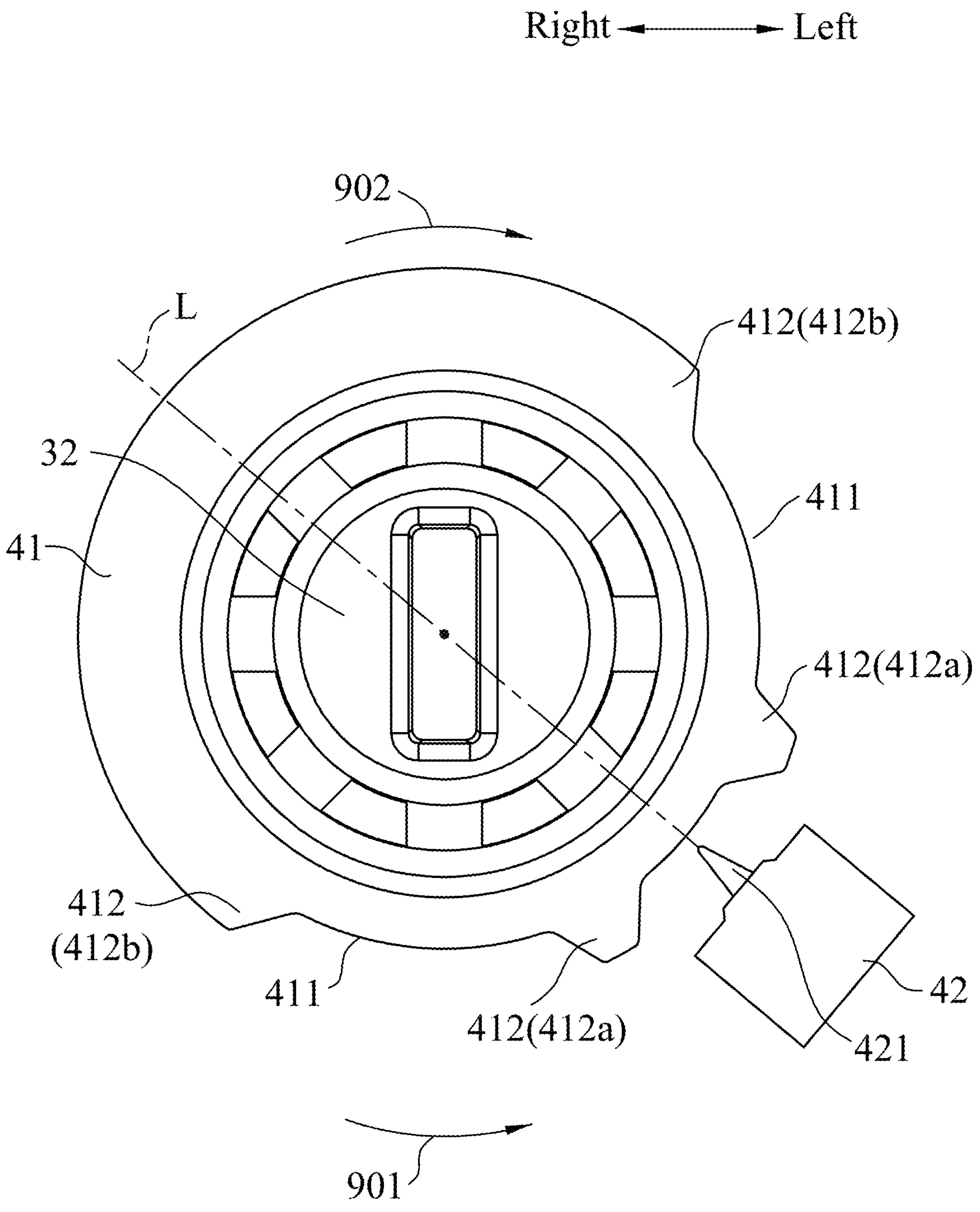
FIG. 5 is a side view of a position determining component and a sensor from FIG. 3.

Further referring to FIG. 5, the position determining component 41 is substantially ring-shaped and coaxially connected to the knob 32. In embodiments, when the knob 32 is operated to move between the horizontal position and the vertical position, the position determining component 41 is also driven to rotate in sync with the movement of the knob 32.

The sensor 42 is disposed near a periphery of the position determining component 41. The direction determining module 43 is electrically connected to the sensor 42 and the lock mechanism 3. The control module 44 is electrically connected to the direction determining module 43 and the lock mechanism 3. In this embodiment, the direction determining module 43 and the control module 44 are integrated on a circuit board, and includes a processor and a memory device that are configured to perform the operations as described below.

The processor may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), and/or a radio-frequency integrated circuit (RFIC), etc.

The memory device may be embodied using, for example, random access memory (RAM), read only memory (ROM), programmable ROM (PROM), firmware, and/or flash memory, etc.

It is noted however that, the arrangement of the direction determining module 43 and the control module 44 is not limited to the above. In some embodiments, the control unit 4 further includes a control panel (not depicted in the drawings) that is disposed on the housing 30 and that serves as an interface for a user to interact with the control unit 4.

In the example of FIGS. 1 and 5, the lock mechanism 3 is set in the left setting, and is in the left-side locked state. At this stage, the knob 32 is in the vertical position, and relative positions of the position determining component 41 and the sensor 42 are as shown in FIG. 5.

When the lock mechanism 3 is being controlled to move between different states, the position determining component 41 is driven to rotate in one of a first direction 901 and a second direction 902. The position determining component 41 has a central axis that extends through the center of the position determining component 41 in FIG. 5, and a sensing curve surface 411 that has an annular span of approximately 180 degrees (e.g., exactly 180 degrees) with respect to the central axis. A middle line (L) is defined as a line that extends through the central axis and that evenly divides the sensing curve surface 411 into two halves. In this embodiment, the knob 32 and the position determining component 41 have a common central axis, and the rotation of the knob 32 and the rotation of the position determining component 41 are simultaneous.

The position determining component 41 further has a plurality of reference parts 412 disposed on the sensing curve surface 411, arranged around the central axis, and spaced apart from one another. In the example of FIG. 5, four reference parts 412 are present, and are symmetrically arranged with respect to the middle line (L). Specifically, two proximal reference parts 412*a* and two distal reference parts 412*b* are provided. Each of the proximal reference parts 412*a* is in the form of a bump having a substantially trapezoid shape (defined by an inclining surface, a flat surface, and a declining surface), and each of the distal reference parts 412*b* is in the form of an inclining surface and a flat surface. It is noted that each of the reference parts 412 may be said to extend outwardly with respect to the central axis.

The sensor 42 is disposed on the middle line (L), and includes a tip 421 that points at and is aligned with the middle line (L). In the example of FIG. 5, when the lock mechanism 3 is in the locked state (e.g., the left-side locked state or the right-side locked state), the tip 421 is disposed between the proximal reference parts 412*a*.

When the position determining component 41 is driven to rotate, the tip 421 will come into contact with one of the reference parts 412. The tip 421 may have different positional relationship with the reference parts 412 in terms of its contact, or the lack thereof, with the reference parts 412. In this embodiment, the tip 421 may be disposed in one of three different positions. In a first position, the tip 421 is not in contact with any one of the reference parts 412 (see FIGS. 5, 9 and 13). In a second position, the tip 421 is in contact with one of the reference parts 412, and is pushed downward by the reference part 412 (see FIGS. 8, 11 and 14). In a third position, the tip 421 is in contact with one of the reference parts 412, and is pushed upward by the reference part 412 (see FIGS. 7, 10 and 12). The difference between the second and third positions is attributed to the specific configurations of the reference parts 412.

In response to the positional relationship with the reference parts 412, the sensor 42 is configured to generate a specific sensing signal for each of the three positions. For example, three different sensing signals in the form of a digit “0”, “1” and “2” may be generated by the sensor 42 when it is determined that the tip 421 is in the first position, the second position and the third position, respectively.

The direction determining module 43 may execute a direction determining process to determine, when the bi-directional electronic lock device 200 is mounted on the door 700, which one of the left setting and the right setting is to be employed. During the direction determining process, the direction determining module 43 is configured to control the lock mechanism 3 to drive the position determining component 41 to rotate along a predetermined direction. During the rotation of the position determining component 41, the positional relationship between the position determining component 41 and the sensor 42 may result in a plurality of sensing signals being generated sequentially. In response to receipt of the plurality of sensing signals, the direction determining module 43 is configured to generate a directional signal based on the content of the plurality of sensing signals.

The control module 44 stores the left setting and the right setting therein. In response to receipt of the directional signal, the control module 44 is configured to set the lock mechanism 3 to one of the left setting and the right setting according to the direction signal. That is to say, when the directional signal indicates that the bi-directional electronic lock device 200 is mounted on a left-handed door, the control module 44 is configured to set the lock mechanism 3 in the left setting, so the lock mechanism 3 may be switched between the left-side unlocked state and the left-side locked state. Alternatively, when the directional signal indicates that the bi-directional electronic lock device 200 is mounted on a right-handed door, the control module 44 is configured to set the lock mechanism 3 in the right setting, so the lock mechanism 3 may be switched between the right-side unlocked state and the right-side locked state.

Figure 6:
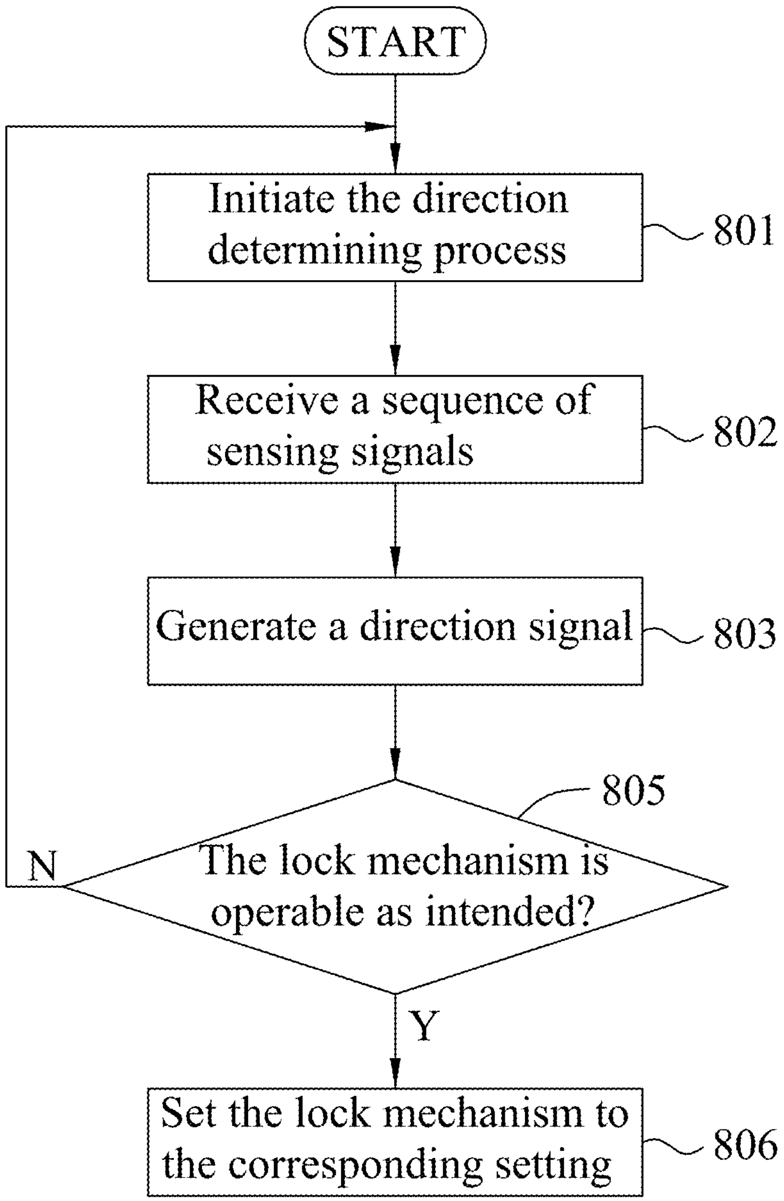
FIG. 6 is a flow chart illustrating steps of a method for setting up the bi-directional electronic lock device according to one embodiment of the disclosure.

FIG. 6 is a flow chart illustrating steps of a method for setting up the bi-directional electronic lock device 200 according to one embodiment of the disclosure. In this embodiment, the method is implemented using the control unit 4, and the left-handed door 700 as shown in FIG. 1 is used as an example.

It is note that in some embodiments, prior to the method being implemented, the knob 32 may be operated to turn in one of the clockwise and the counterclockwise direction, and the deadbolt 31 and the position determining component 41 are driven by the action of the knob 32 to rotate. This is done prior to the method to first determine whether the operations among the knob 32, the deadbolt 31 and the position determining component 41 are normal (specifically, the deadbolt 31 can be normally driven by the knob 32).

Afterward, in step 801, the user may operate the control panel of the control unit 4 to control the direction determining module 43 to execute the direction determining process.

In response, the direction determining module 43 initiates the direction determining process, in which the direction determining module 43 is configured to control the lock mechanism 3 to drive the position determining component 41 to rotate along a predetermined direction (along the arrow 901 in this embodiment) by an angle up to 90 degrees. During the rotation of the position determining component 41, the positional relationship between the position determining component 41 and the sensor 42 may result in a plurality of sensing signals being generated sequentially. In response to receipt to the plurality of sensing signals, the direction determining module 43 is configured to generate a directional signal.

In step 802, the direction determining module 43 receives a sequence of sensing signals from the sensor 42, and terminates the direction determining process when the sensing signals conform with a predetermined condition. Specifically, in some embodiments, the direction determining module 43 terminates the direction determining process when one of a predetermined number of pre-stored sequences of sensing signals is received, or when it is determined that the sensing signal has not varied for a predetermined time period.

It is noted that when the direction determining process commences, an initial angular location of the position determining component 41 may be different from that shown in FIG. 5. In fact, the initial angular location of the position determining component 41 may be any one illustrated in FIGS. 5 and 7 to 10 (where FIG. 10 corresponds with the left-side unlocked state).

Referring to FIG. 5, which illustrates one possible initial angular location of the position determining component 41, where the tip 421 is located between the proximal reference parts 412_a_ without contacting any one of the reference parts 412; at this stage, a corresponding sensing signal "0" is generated. Then, as the position determining component 41 is driven to rotate along the arrow 901, the tip 421 may first come into contact with one of the proximal reference parts 412_a_ and be in the third position (see FIG. 7), and a corresponding sensing signal "2" is generated. Afterward, the position determining component 41 is further rotated such that the tip 421 is located between the one of the proximal reference parts 412_a_ and one of the distal reference parts 412_b_ without contacting any one of the reference parts 412 (see FIG. 9), and a corresponding sensing signal "0" is generated. Finally, the position determining component 41 is rotated by 90 degrees, the lock mechanism 3 reaches the left-side unlocked state, the tip 421 comes into contact with the one of the distal reference parts 412_b_ and be in the third position (see FIG. 10), and a corresponding sensing signal "2" is generated. As such, a sequence of sensing signals "0-2-0-2" is generated during the direction determining process.

Figure 7:
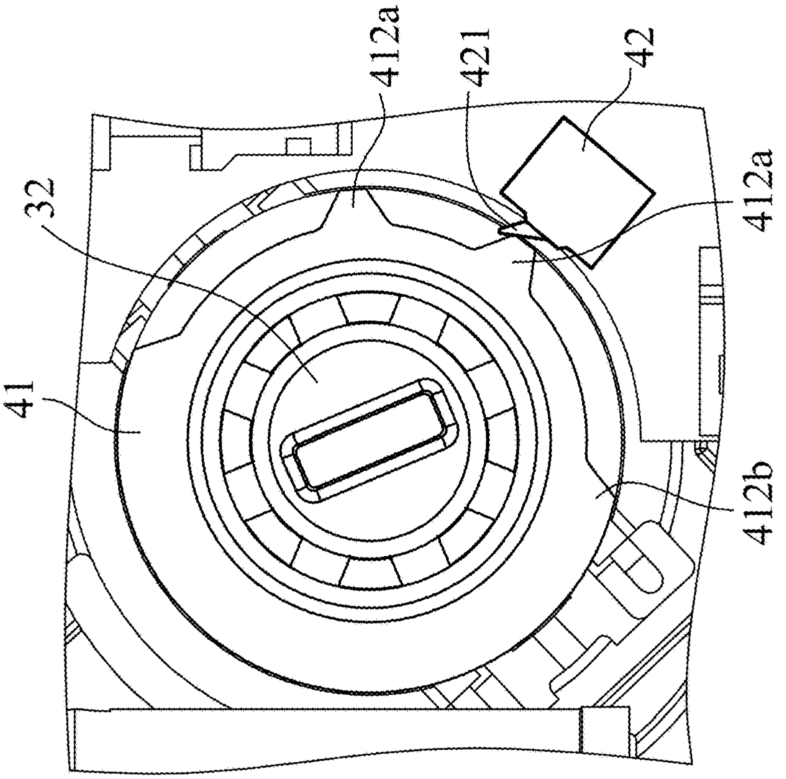

In another example, the initial angular location of the position determining component 41 is as shown in FIG. 7. In this example, at the start of the direction determining process, the tip 421 is in contact with one of the proximal reference parts 412_a_ in the third position, and a corresponding sensing signal "2" is generated. Then, the position determining component 41 starts to rotate along the arrow 901, and the tip 421 is now located between the one of the proximal reference parts 412_a_ and the corresponding one of the distal reference parts 412_b_ without contacting any one of the reference parts 412 (see FIG. 9), and a corresponding sensing signal "0" is generated. Then, the position determining component 41 is further rotated until the tip 421 comes into contact with the corresponding one of the distal reference parts 412_b_ and is in the third position (see FIG. 10), and a corresponding sensing signal "2" is generated. At this stage, while the position determining component 41 has not been rotated by 90 degrees yet, since the lock mechanism 3 has reached the left-side unlocked state, the position determining component 41 cannot be rotated any further. As such, the sensing signal will not vary any more, and the sensor 42 is configured to generate a sensing signal "X" instead after a predetermined time period has elapsed, and then the direction determining module 43 terminates the direction determining process. As a result, a sequence of sensing signals "2-0-2-X" is generated during the direction determining process.

In some embodiments, in response to the sensing signal "X", the direction determining module 43 temporarily pauses and restarts the direction determining process until a sequence of sensing signals including a predetermined number of sensing signals (e.g., four) is generated, before terminating the direction determining process. In some embodiments, the direction determining module 43 may terminate the direction determining process in response to receipt of the sensing signal "X".

Figure 8:
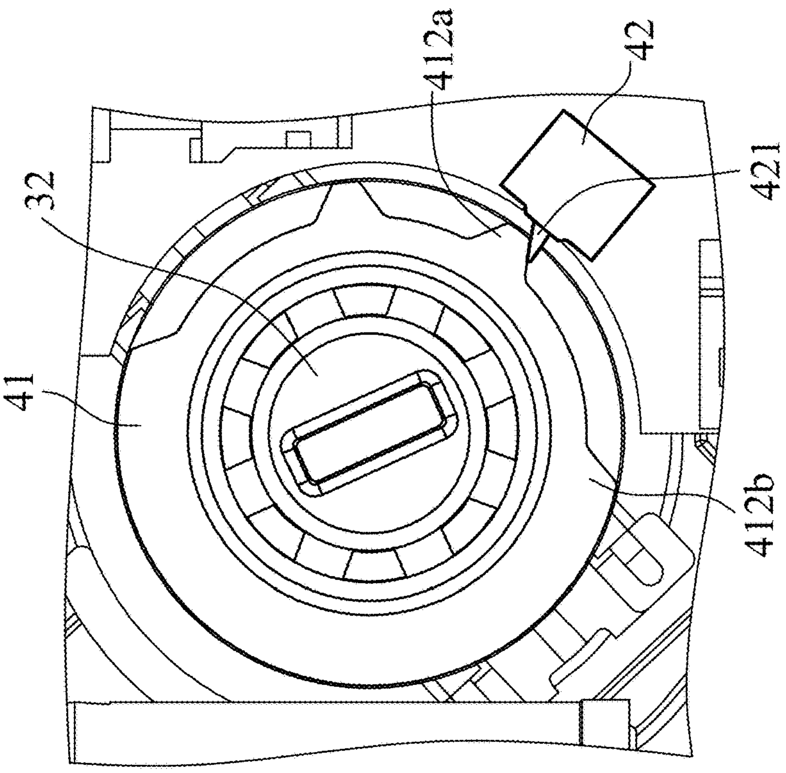
FIGS. 7 to 14 are fragmentary schematic views illustrating the position determining component and the sensor being in different relative positions.

In another example, the initial angular location of the position determining component 41 is as shown in FIG. 8. In this example, at the start of the direction determining process, the tip 421 is in contact with one of the proximal reference parts 412_a_ in the second position, and a corresponding sensing signal "1" is generated. Then, the position determining component 41 starts to rotate along the arrow 901, and the tip 421 is located between the one of the proximal reference parts 412_a_ and the one of the distal reference parts 412_b_ without contacting any one of the reference parts 412 (see FIG. 9), and a corresponding sensing signal "0" is generated. Then, the position determining component 41 is further rotated until the tip 421 comes into contact with one of the distal reference parts 412_b_ and is in the third position (see FIG. 10), and a corresponding sensing signal "2" is generated. At this stage, while the position determining component 41 has not been rotated by 90 degrees yet, since the lock mechanism 3 has reached the left-side unlocked state, the position determining component 41 cannot be rotated any further. As such, the sensing signal will not vary, and the sensor 42 is configured to generate the sensing signal "X" after a predetermined time period has elapsed, and then the direction determining module 43 terminates the direction determining process. As a result, a sequence of sensing signals "1-0-2-X" is generated during the direction determining process.

Figure 9:
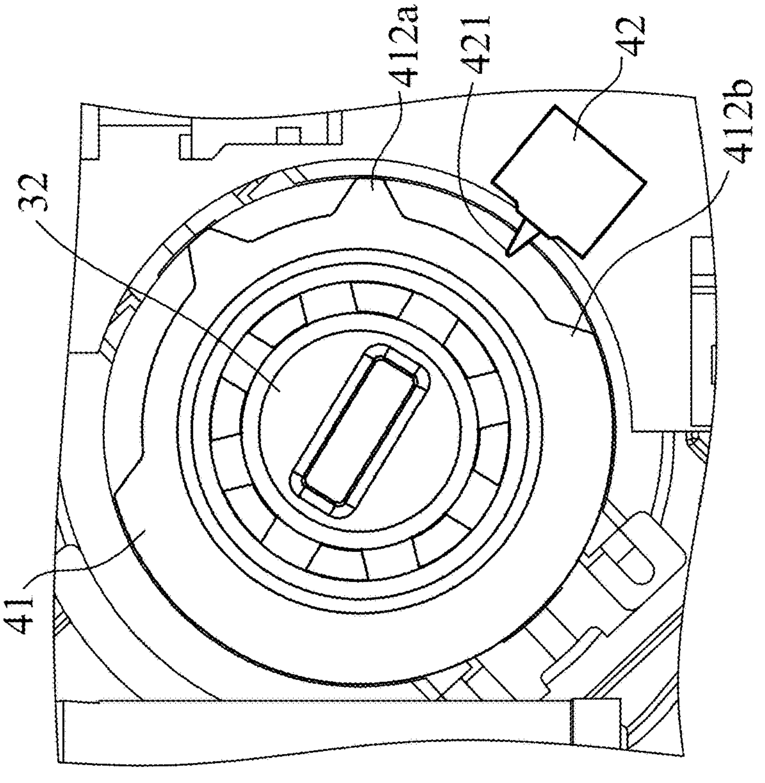

In another example, the initial angular location of the position determining component 41 is as shown in FIG. 9. In this example, at the start of the direction determining process, the tip 421 is located between the one of the proximal reference parts 412_a_ and the one of the distal reference parts 412_b_ without contacting any one of the reference parts 412 (see FIG. 9), and a corresponding sensing signal "0" is generated. Then, the position determining component 41 is rotated until the tip 421 comes into contact with the one of the distal reference parts 412_b_ (see FIG. 10) and is in the third position, and a corresponding sensing signal "2" is generated. At this stage, while the position determining component 41 has not been rotated by 90 degrees yet, since the lock mechanism 3 has reached the left-side unlocked state, the position determining component 41 cannot be rotated any further. As such, the sensing signal will not vary, and the sensor 42 is configured to generate the sensing signal "X" after a predetermined time period has elapsed, and then the direction determining module 43 terminates the direction determining process. As a result, a sequence of sensing signals "0-2-X" is generated during the direction determining process. In some embodiments, in response to the sensing signal "X", the direction determining module 43 temporarily pauses and restarts the direction determining process, which results in another sensing signal "X" and the resultant sequence of sensing signals "0-2-X-X", at which time a sequence of sensing signals including four sensing signals is generated, and the direction determining process is then terminated.

Figure 10:
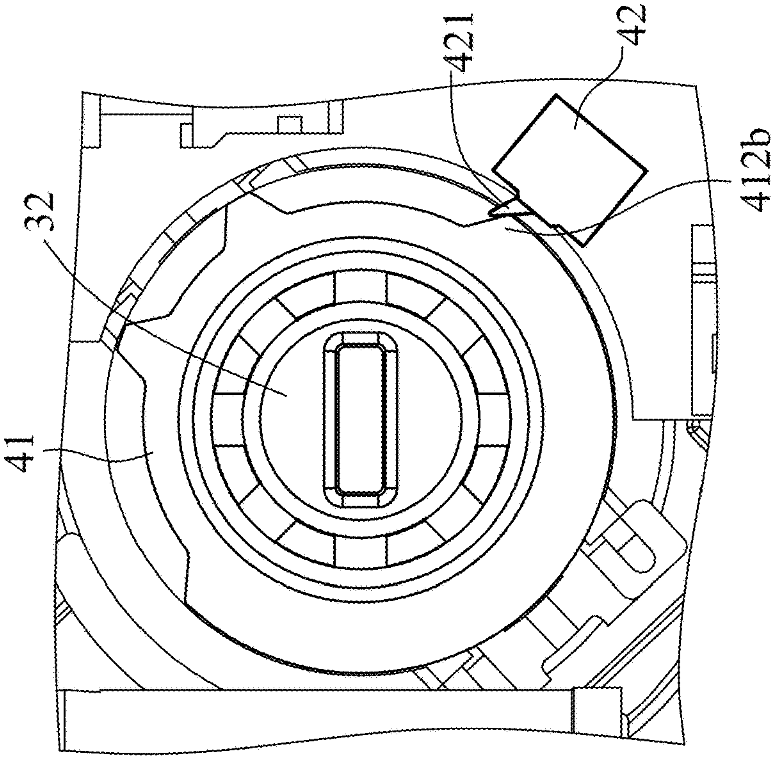

In another example, the initial angular location of the position determining component 41 is as shown in FIG. 10. In this example, at the start of the direction determining process, the tip 421 is in contact with the one of the distal reference parts 412_b_ in the third position, and a corresponding sensing signal "2" is generated. At this stage, while the position determining component 41 has not been rotated by 90 degrees yet, since the lock mechanism 3 has reached the left-side unlocked state, the position determining component 41 cannot be rotated any further. As such, the sensing signal will not vary, and the sensor 42 is configured to generate the sensing signal "X" after a predetermined time period has elapsed, and then the direction determining module 43 terminates the direction determining process. As a result, a sequence of sensing signals "2-X" is generated during the direction determining process. In some embodiments, in response to the first appearance of the sensing signal "X", the direction determining module 43 temporarily pauses and restarts the direction determining process twice, which results in another two sensing signals "X" and the resultant sequence of sensing signals "2-x-X-X", at which time, a sequence of sensing signals including four sensing signals is generated, and the direction determining process is then terminated.

The following Table 1 lists a number of possible sequences of sensing signals that are associated with the left setting, according to one embodiment of the disclosure.

TABLE 1

| Left setting | |
|---|---|
| Initial angular location | Sequence of sensing signals |
| FIG. 5 | 0 - 2 - 0 - 2 |
| FIG. 7 | 2 - 0 - 2 - X |
| FIG. 8 | 1 - 0 - 2 - X |
| FIG. 9 | 0 - 2 - X - X |
| FIG. 10 | 2 - X - X - X |

It is noted that Table 1 and another Table listing a number of possible sequences of sensing signals that are associated with the right setting may be pre-stored in the direction determining module 43. Additionally, in other embodiments, since the shape of the position determining component 41 may be different, other sequences of sensing signals with different lengths may be employed, and relevant implementation should not be limited to the disclosure herein.

Afterward, the flow proceeds to step 803. In this step, the direction determining module 43 determines whether the sequence of sensing signals indicates that the bi-directional electronic lock device 200 is to be set to the left setting or is to be set to the right setting. In this embodiment, when the bi-directional electronic lock device 200 is mounted on a left-handed door 700, and the initial angular location of the position determining component 41 would be that shown in one of FIGS. 5, 7 to 10, and one of the sequences of sensing signals listed in Table 1 should be generated. As such, in this example, in step 803, the direction determining module 43 generates a direction signal that indicates that the lock mechanism 3 is to be set to the left setting.

In step 805, the control module 44, in response to receipt of the directional signal, controls the lock mechanism 3 to operate in the corresponding setting and determines whether the lock mechanism 3 is operable as intended. Specifically, in this embodiment, the control module 44 may control the lock mechanism 3 to switch from the left-side locked state to the left-side unlocked state, and determine whether the lock mechanism 3 is operable as intended in the left setting. In some embodiments, the control module 44 may control the lock mechanism 3 to switch from the left-side unlocked state to the left-side locked state, and determine whether the lock mechanism 3 is operable as intended in the left setting. In other embodiments, the control module 44 may control the lock mechanism 3 to switch from the left-side locked state to the left-side unlocked state and then switch from the left-side unlocked state back to the left-side locked state, and determine whether the lock mechanism 3 is operable as intended in the left setting. When it is determined that the lock mechanism 3 is operable as intended, the flow proceeds to step 806. Otherwise, the flow goes back to step 801 to implement steps 801 to 803 again.

In step 806, the control module 44 sets the lock mechanism 3 to the corresponding setting (e.g., stores the left setting as a current setting for the bi-directional electronic lock device 200 for subsequent use), and the method is completed. Afterward, the bi-directional electronic lock device 200 may be controlled to lock or unlock the left-handed door 700.

According to one embodiment of the disclosure, the method is implemented using the control unit 4, and a right-handed door is used as an example.

It is note that in some embodiments, similar to the case of the left-handed door, the knob 32 may be first operated to turn in one of the clockwise and the counterclockwise direction, and the deadbolt 31 and the position determining component 41 are driven by the action of the knob 32 to rotate. This is done prior to the method to first determine whether the operations among the knob 32, the deadbolt 31 and the position determining component 41 are normal (specifically, the deadbolt 31 can be normally driven by the knob 32).

In step 801, the user may operate the control panel of the control unit 4 to control the direction determining module 43 to execute the direction determining process.

In response, the direction determining module 43 initiates the direction determining process, in which the direction determining module 43 is configured to control the lock mechanism 3 to drive the position determining component 41 to rotate along a predetermined direction (along the arrow 901 in this embodiment) by an angle up to 90 degrees. During the rotation of the position determining component 41, the positional relationship between the position determining component 41 and the sensor 42 may result in a plurality of sensing signals being generated sequentially. In response to receipt of the plurality of sensing signals, the direction determining module 43 is configured to generate a directional signal.

In step 802, the direction determining module 43 receives a plurality of sensing signals from the sensor 42, and terminates the direction determining process when the sensing signals conforms with a predetermined condition. Specifically, in some embodiments, the direction determining module 43 terminates the direction determining process when one of a predetermined number of pre-stored sequences of sensing signals is received, or when it is determined that the sensing signal has not varied for a predetermined time period.

It is noted that when the direction determining process commences, an initial angular location of the position determining component 41 may be different from that shown in FIG. 5. In fact, the initial angular location of the position determining component 41 may be any one illustrated in FIGS. 5 and 11 to 14 (wherein FIG. 14 corresponds with the right-side unlocked state).

In this example, the initial angular location of the position determining component 41 is as shown in FIG. 5. As such, at the start of the direction determining process, a corresponding sensing signal "0" is generated since the tip 421 is not in contact with any of the reference parts 412. Then, while the position determining component 41 has not been rotated by 90 degrees yet, since the bi-directional electronic lock device 200 is mounted on a right-handed door, the position determining component 41 cannot be rotated further along the arrow 901. As such, the sensing signal will not vary any more, and the sensor 42 is configured to generate the sensing signal "X" after a predetermined time period, and then the direction determining module 43 terminates the direction determining process. As a result, a sequence of sensing signals "0-X" is generated during the direction determining process. In some embodiments, in response to the sensing signal "X", the direction determining module 43 temporarily pauses and restarts the direction determining process twice, which results in generation of another two sensing signals "X" and the resultant sequence of sensing signals "0-X-X-X", at which time a sequence of sensing signals including four sensing signals is generated, and the direction determining process is then terminated.

Figure 11:
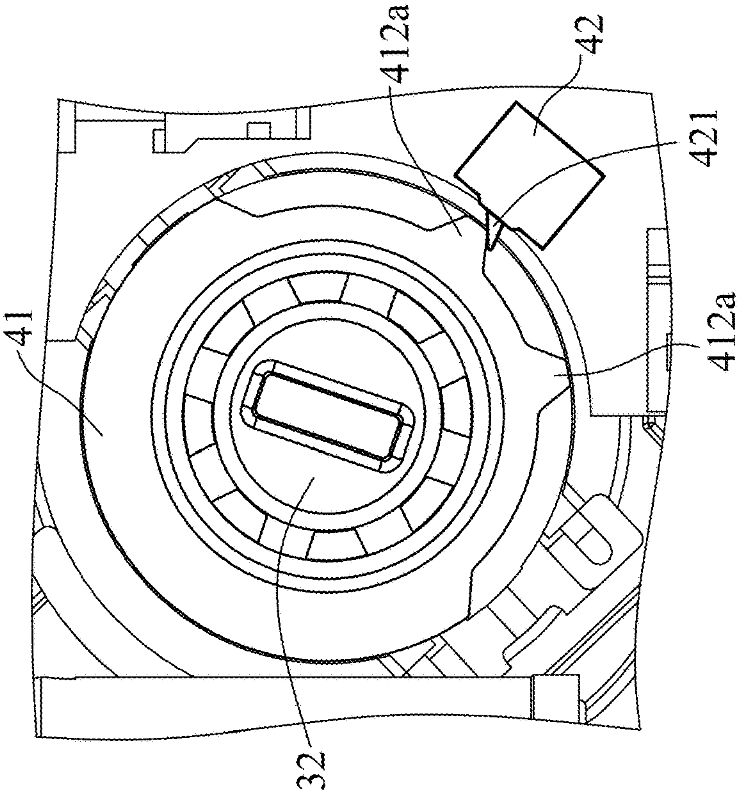

In another example, the initial angular location of the position determining component 41 is as shown in FIG. 11. In this example, at the start of the direction determining process, the tip 421 is in contact with the other one of the proximal reference parts 412*a* in the second position, and a corresponding sensing signal "1" is generated. Then, the position determining component 41 is rotated until the tip 421 is located between the proximal reference parts 412*a* (see FIG. 5) and does not contact any reference part 412, and a corresponding sensing signal "O" is generated. Then, while the position determining component 41 has not been rotated by 90 degrees yet, since the bi-directional electronic lock device 200 is mounted on a right-handed door, the position determining component 41 cannot be rotated further along the arrow 901. As such, the sensing signal will not vary, and the sensor 42 is configured to generate the sensing signal "X" after a predetermined time period has elapsed, and then the direction determining module 43 terminates the direction determining process. As a result, a sequence of sensing signals "1-0-X" is generated during the direction determining process. In some embodiments, in response to the sensing signal "X", the direction determining module 43 temporarily pauses and restarts the direction determining process, which results in another sensing signal "X" and the resultant sequence of sensing signals "1-0-X-X", at which time, a sequence of sensing signals including four sensing signals is generated, and the direction determining process is then terminated.

Figure 12:
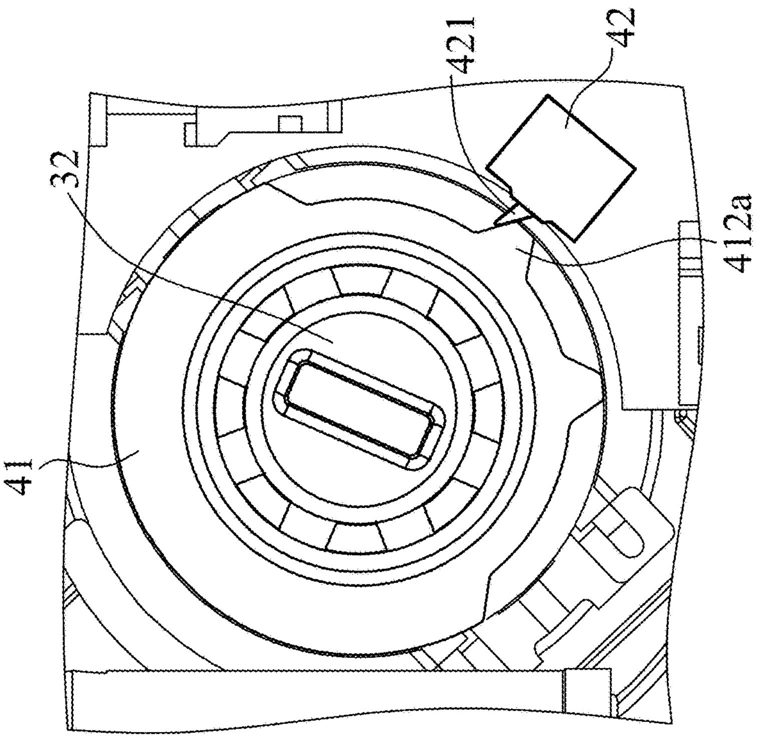

In another example, the initial angular location of the position determining component 41 is as shown in FIG. 12. In this example, at the start of the direction determining process, the tip 421 is in contact with the other one of the proximal reference parts 412*a* in the third position, and a corresponding sensing signal "2" is generated. Then, the position determining component 41 is rotated until the tip 421 is located between the proximal reference parts 412*a* and does not contact any reference part 412 (see FIG. 5), and a corresponding sensing signal "0" is generated. Then, while the position determining component 41 has not been rotated by 90 degrees yet, since the bi-directional electronic lock device 200 is mounted on a right-handed door, the position determining component 41 cannot be rotated further along the arrow 901. As such, the sensing signal will not vary, and the sensor 42 is configured to generate the sensing signal "X" after a predetermined time period has elapsed, and then the direction determining module 43 terminates the direction determining process. As a result, a sequence of sensing signals "2-0-X" is generated during the direction determining process. In some embodiments, in response to the sensing signal "X", the direction determining module 43 temporarily pauses and restarts the direction determining process, which results in another sensing signal "X" and the resultant sequence of sensing signals "2-0-X-X", at which time a sequence of sensing signals including four sensing signals is generated, and the direction determining process is then terminated.

Figure 13:
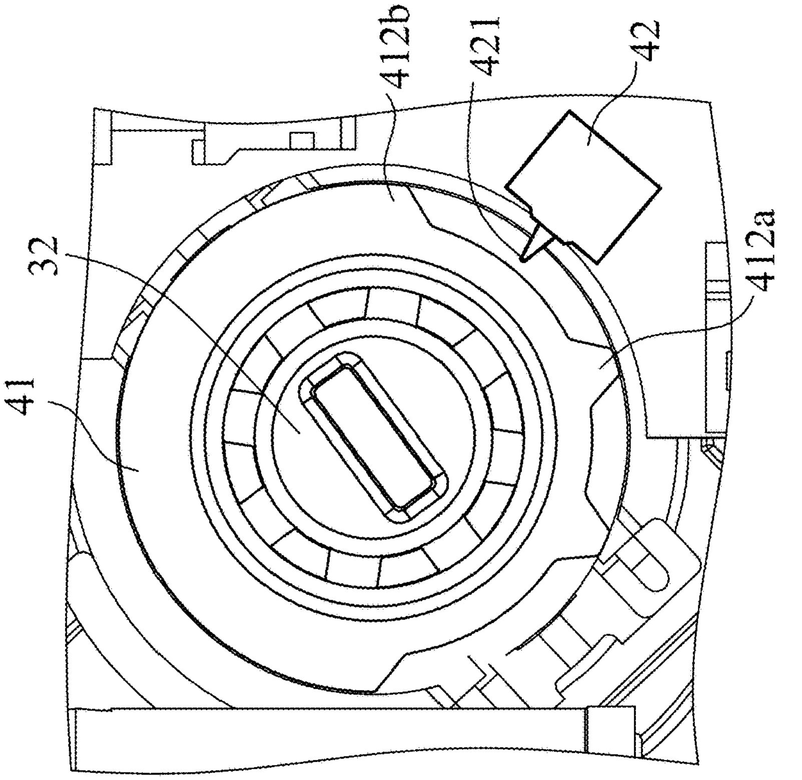

In another example, the initial angular location of the position determining component 41 is as shown in FIG. 13. In this example, at the start of the direction determining process, the tip 421 is located between the other one of the proximal reference parts 412*a* and the other one of the distal reference parts 412*b* and does not contact any reference part 412, and a corresponding sensing signal "0" is generated. Then, the position determining component 41 is rotated and the tip 421 comes in contact with the other proximal reference parts 412*a* in the third position, and a corresponding sensing signal "2" is generated. Then, the position determining component 41 is further rotated until the tip 421 is located between the proximal reference parts 412*a* (FIG. 5) and does not contact any reference part 412, and a corresponding sensing signal "0" is generated. Then, while the position determining component 41 has not been rotated by 90 degrees yet, since the bi-directional electronic lock device 200 is mounted on a right-handed door, the position determining component 41 cannot be rotated a further long the arrow 901. As such, the sensing signal will not vary, and the sensor 42 is configured to generate the sensing signal "X" after a predetermined time period has elapsed, and then the direction determining module 43 terminates the direction determining process. As a result, a sequence of sensing signals "0-2-0-X" is generated during the direction determining process.

Figure 14:
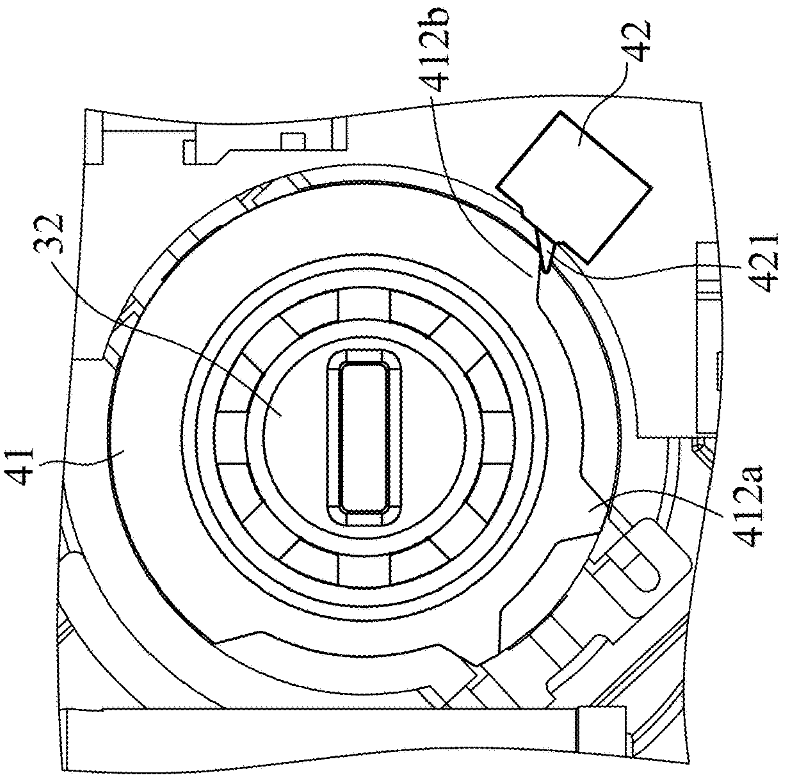

In another example, the initial angular location of the position determining component 41 is as shown in FIG. 14. In this example, at the start of the direction determining process, the tip 421 is in contact with the other one of the distal reference parts 412*b* in the second position, and a corresponding sensing signal "1" is generated. Then, the position determining component 41 starts to rotate along the arrow 901, and the tip 421 is located between the other one of the proximal reference parts 412*a* and the other one of the distal reference parts 412*b* (see FIG. 13) without contacting any reference part 412, and a corresponding sensing signal "0" is generated. Then, the position determining component 41 is rotated further and the tip 421 comes into contact with the other one of the proximal reference parts 412*a* in the third position (see FIG. 12), and a corresponding sensing signal "2" is generated. Finally, the position determining component 41 is further rotated until the tip 421 is located between the proximal reference parts 412*a* (labeled as (a) in FIG. 5) and does not contact any reference part 412, and a corresponding sensing signal "0" is generated. As such, a sequence of sensing signals "1-0-2-0" is generated during the direction determining process.

The following Table 2 lists a number of possible sequences of sensing signals that can be associated with the right setting, according to one embodiment of the disclosure.

TABLE 2

| Right setting | |
|---|---|
| Initial angular location | Sequence of sensing signals |
| FIG. 5 | 0 - X - X - X |
| FIG. 11 | 1 - 0 - X - X |
| FIG. 12 | 2 - 0 - X - X |
| FIG. 13 | 0 - 2 - 0 - X |
| FIG. 14 | 1 - 0 - 2 - 0 |

It is noted that in other embodiments, since the shape of the position determining component 41 may be different, other sequences of sensing signals with different lengths may be employed, and the relevant implementation should not be limited to the disclosure herein.

Afterward, the flow proceeds to steps 803 and 805. It is noted that the operations of steps 803 and 805 in this embodiment are similar to those already described before, and details thereof are omitted herein for the sake of brevity. In step 806, the control module 44 sets the lock mechanism 3 to the right setting, and the method is completed. In some embodiments, during step 806, the direction determining module 43 is further configured to actuate the lock mechanism 3 to switch to the corresponding unlocked state (e.g., the right-side unlocked state), and maintain in the corresponding unlocked state.

It is noted that in this embodiment, each of the reference parts 412 may be said to extend outwardly with respect to the central axis, and according to some embodiments, the reference parts 412 may be disposed to extend in a direction that is parallel to the central axis, while also being spaced apart from one another. Similarly, the sensor 42 may be disposed to be non-coplanar with the position determining component 41, while still being able to come into contact with the reference parts 412 when the position determining component 41 is driven to rotate.

To sum up, embodiments of the disclosure provide a bi-directional electronic lock device 200 and a method for setting up the bi-directional electronic lock device 200 mounted on a door. The bi-directional electronic lock device 200 is configured such that the position determining component 41 is driven to rotate when the lock mechanism 3 is moved, and that the sensor 42 and the position determining component 41 are disposed in a manner that when the position determining component 41 rotates, the positional relationship of the sensor 42 with the position determining component 41 in terms of its contact or the lack thereof with the position determining component 41 is in one of a plurality of positions, and the sensor 42 is configured to generate a specific sensing signal for each of the three positions. As such, based on the shape of the position determining component 41, a direction determining process may be implemented, in which the position determining component 41 is driven to rotate along a specific direction. Based on the resulting sequence of sensing signals, the direction determining module 43 is configured to generate a directional signal indicating whether the lock mechanism 3 of the bi-directional electronic lock device 200 is to be set to the left setting or to the right setting.

In this manner, after the bi-directional electronic lock device 200 is mounted on a door, the method for setting up the bi-directional electronic lock device 200 may be implemented after a user inputs a command (in the form of a starting code), or may be automatically implemented as soon as the bi-directional electronic lock device 200 is mounted onto the door. As such, the potential issues of human errors in the manual setup, and the undesired results of the bi-directional electronic lock device 200 being unable to operate correctly and/or causing damages to components of the bi-directional electronic lock device 200 may be eliminated.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A bi-directional electronic lock device to be mounted on a door that is a left-handed door or a right-handed door, the bi-directional electronic lock device comprising:

a lock mechanism that includes a deadbolt, said lock mechanism being operable to switch between an unlocked state, in which said deadbolt is retracted into the door, and a locked state, in which said deadbolt is extended out of a side of the door, wherein the unlocked state is one of a left-side unlocked state and a right-side unlocked state; and a control unit that includes a position determining component that is driven by said lock mechanism to rotate, a sensor that is disposed to have a positional relationship with said position determining component in one of three different positions in terms of the sensor's contact, or the lack thereof, with the position determining component, and that is configured to generate a specific sensing signal for each of the three positions, a direction determining module that is configured, when activated, to actuate said lock mechanism to switch to one of the left-side unlocked state and the right-side unlocked state while driving said position determining component, to receive a sequence of sensing signals from said sensor, and to generate a directional signal based on the sequence of sensing signals, and a control module that is configured to, in response to receipt of the directional signal, setting said lock mechanism, based on the directional signal, to one of a left setting, in which said lock mechanism is operable to switch between the left-side unlocked state and the locked state, and a right setting, in which said lock mechanism is operable to switch between the right-side unlocked state and the locked state;

wherein said position determining component has a central axis, and a plurality of reference parts which include at least two proximal reference parts that are spaced apart from each other and at least two distal reference parts that are spaced apart from each other, and said at least two proximal reference parts and said at least two distal reference parts are disposed around the central axis;

wherein said sensor is disposed to interact with said at least two proximal reference parts and said at least two distal reference parts of said position determining component in one of the three different positions; and wherein said direction determining module stores a first table that lists a number of possible sequences of sensing signals which are associated with the left setting and a second table that lists a number of possible sequences of sensing signals which are associated with the right setting, and determines whether the sequence of sensing signals indicates that the bi-directional electronic lock device is to be set to the left setting or indicates that the bi-directional electronic lock device is to be set to the right setting based on the sequence of sensing signals and the content of the first table and the second table.

2. The bi-directional electronic lock device of claim 1, wherein:

said position determining component further has a sensing curve surface that has an annular span with respect to the central axis;

said plurality of reference parts are disposed on said sensing curve surface, arranged around the central axis, and spaced apart from one another; and said sensor includes a tip that is disposed to come into contact with one of said plurality of reference parts when said position determining component is driven to rotate.

3. The bi-directional electronic lock device of claim 2, wherein:

said plurality of reference parts are symmetrically arranged with respect to a middle line (L) that extends through the central axis and that evenly divides said sensing curve surface into two halves; and when said lock mechanism is in the locked state, said tip is disposed between said proximal reference parts and not in contact with any one of said plurality of reference parts.

4. The bi-directional electronic lock device of claim 3, wherein said sensing curve surface has an annular span of 180 degrees with respect to the central axis.

5. The bi-directional electronic lock device of claim 1, wherein:

said lock mechanism further includes a knob coaxially connected to said position determining component; and when said knob is rotated, said lock mechanism is driven to move said deadbolt between the locked state and one of the left-side unlocked state and the right-side unlocked state.

6. A method for setting up a bi-directional electronic lock device that is mounted on a door, the method comprising:

executing a direction determining process, in which a lock mechanism of the bi-directional electronic lock device is actuated to drive a position determining component of a control unit of the bi-directional electronic lock device to rotate along a predetermined direction, the control unit including a sensor that is disposed to have a positional relationship with the position determining component in one of three different positions in terms of the sensor's contact, or the lack thereof, with the position determining component, and that is configured to generate a specific sensing signal for each of the three positions;

receiving a sequence of sensing signals from the sensor;

based on the sequence of sensing signals, generating a direction signal; and in response to receipt of the direction signal, setting the lock mechanism in one of a left setting and a right setting based on the direction signal;

the method further comprising, prior to setting up the lock mechanism:

controlling, based on the direction signal, the lock mechanism to operate in one of the left setting, in which the lock mechanism is operable to switch between a left unlocked state and a locked state, and the right setting, in which the lock mechanism is operable to switch between a right unlocked state and the locked state, and determining whether the lock mechanism is operable as intended; and when the determination is affirmative, storing the one of the left setting and the right setting as a current setting for the bi-directional electronic lock device;

wherein the position determining component has a central axis, and a plurality of reference parts which include at least two proximal reference parts that are spaced apart from each other and at least two distal reference parts that are spaced apart from each other, and the at least two proximal reference parts and the at least two distal reference parts are disposed around the central axis;

wherein the sensor is disposed to interact with the at least two proximal reference parts and the at least two distal reference parts of said position determining component in one of the three different positions; and wherein the direction determining module stores a first table that lists a number of possible sequences of sensing signals which are associated with the left setting and a second table that lists a number of possible sequences of sensing signals which are associated with the right setting, and setting the lock mechanism in one of a left setting and a right setting based on the direction signal includes determining whether the sequence of sensing signals indicates that the bi-directional electronic lock device is to be set to the left setting or indicates that the bi-directional electronic lock device is to be set to the right setting based on the sequence of sensing signals and the content of the first table and the second table.

7. The method of claim 6, further comprising, when the determination is negative:

repeating the steps of executing the direction determining process, receiving a sequence of sensing signals and generating the direction signal.

8. The method of claim 6, wherein the step of storing the one of the left setting and the right setting further includes actuating the lock mechanism to switch to the unlocked state.

* * * * *